United States Patent

[11] 3,599,436

[72] Inventors: Joe C. Lochridge; William R. Rochelle, both of Houston, Tex.
[21] Appl. No. 817,495
[22] Filed Apr. 18, 1969
[45] Patented Aug. 17, 1971
[73] Assignee Brown & Root, Inc. Houston, Tex.

[54] PIPELINE CONNECTIONS WITH UNDERWATER WORK CHAMBER
13 Claims, 7 Drawing Figs.

[52] U.S. Cl. .................................................. 61/72.3, 61/69, 29/429, 166/.5, 166/.6
[51] Int. Cl. .................................................. F16l 25/00, F16l 35/00
[50] Field of Search .................................................. 61/72.3, 72.1, 46.5, 69, 63; 166/0.6, 0.5; 285/24, 27, 18; 29/429

[56] References Cited
UNITED STATES PATENTS

| | | | |
|---|---|---|---|
| 2,667,751 | 2/1954 | Osborn | 61/69 |
| 3,298,092 | 1/1967 | Dozier et al. | 61/72.3 X |
| 3,358,753 | 12/1967 | Haeber | 166/.6 |
| 3,407,611 | 10/1968 | Coultrup | 61/72.3 |
| 3,482,410 | 12/1969 | Roesky et al. | 61/69 |

Primary Examiner—Jacob Shapiro
Attorney—Burns, Doane, Swecker & Mathis

ABSTRACT: A method and apparatus for completing a connection of a pipeline to an underwater installation characterized by the use of an underwater work chamber to isolate the submerged termini of the pipeline and an installation conduit from the water body prior to welding the two into fluid communication.

PATENTED AUG 17 1971

INVENTORS
JOE C. LOCHRIDGE
WILLIAM R. ROCHELLE

BY
Burns, Doane, Benedict, Swecker & Mathis
ATTORNEYS

INVENTORS
JOE C. LOCHRIDGE
WILLIAM R. ROCHELLE

BY
Burns, Doane, Benedict, Swecker & Mathis
ATTORNEYS

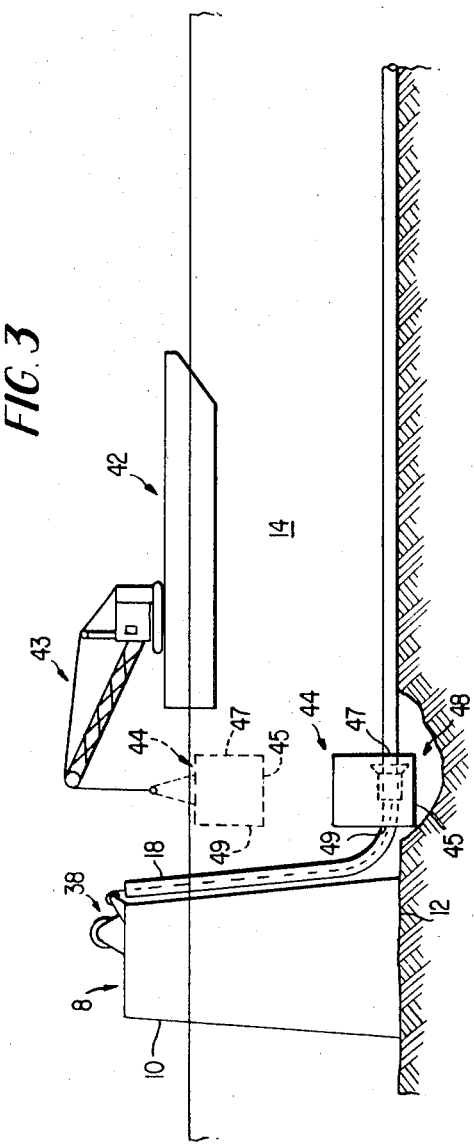
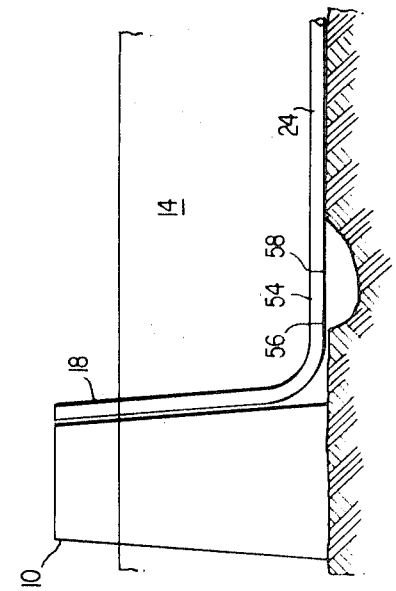
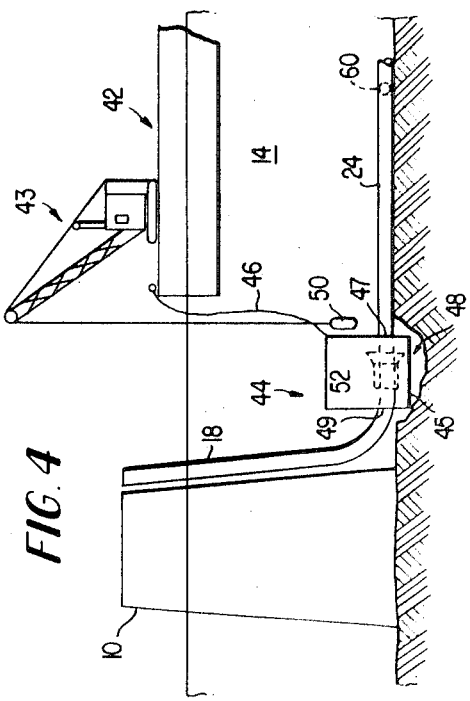
INVENTORS
JOE C. LOCHRIDGE
WILLIAM R. ROCHELLE
BY Burns, Doane, Benedict, Swecker & Mathis
ATTORNEYS

PIPELINE CONNECTIONS WITH UNDERWATER WORK CHAMBER

BACKGROUND OF THE INVENTION

This invention relates to underwater pipelaying. More particularly, this invention relates to a method and apparatus for connecting a pipeline terminus to an underwater installation.

In pipelaying methods, it has been proposed to make the initial or terminal connection of a flow line to an underwater installation by mechanically coupling the submerged flow line terminus of a conduit portion to the underwater installation. Techniques developed for such couplings usually involve the need for various sealing assemblies between the flow line and the installation.

Since these assemblies may require replacement after a time, it would be highly desirable to eliminate the need for their provision.

Moreover, it would also be desirable to eliminate the need for producing fairly intricate coupling assemblies for each initial or terminal connection.

The present invention involves the welding of the flow line to a conduit of an underwater installation so as to obviate the need for sealing and coupling assemblies. Such welding operations have been accomplished in the past in the connection of pipelines to risers. However, the pipeline has been welded to an installation conduit known as a riser at a station above the surface of the water, and then the entire welded assembly has been lowered to a submerged position.

In order to avoid damaging the pipeline during lowering, by introducing undesirable stresses therein, the handling of the riser and the length of pipeline adjacent to the welded portion requires precision controls. Since an error in the lowering operation could have damaging consequences from the standpoint of both equipment and personnel, it would be highly desirable to obtain the advantages of a welded connection, while avoiding the necessity of lowering the riser and connected pipeline. This is accomplished by isolating the submerged termini of the flow line and the installation conduit from the body of water by placing an underwater work chamber, or habitat, thereabout.

Underwater work chambers have been proposed in the past for an entirely different purpose, i.e., to isolate damaged sections of submerged pipelines remote from the pipeline terminus. However, their use to facilitate the terminal connection of a pipeline to an underwater installation conduit advantageously avoids the previously described problems associated with both the lowering of a cumbersome welded connection and the replacement of coupling and sealing assemblies.

OBJECTS AND SUMMARY OF INVENTION

It is therefore a general object of the invention to provide a method and apparatus for making a terminal connection to an underwater installation conduit which overcomes problems of the sort previously noted.

It is a particular object of the invention to provide a method and apparatus for making such a connection facilitated by the use of an underwater work chamber, so as to avoid the need for lowering of a welded connection.

It is another object of the invention to provide a method and apparatus for making underwater conduit connections which provide for aligning the conduits prior to effecting a welded connection within a dry work chamber.

It is a related object of the invention to provide a method and apparatus for making underwater conduit connections by aligning the conduits in such a way that the termini thereof may be removed and replaced, within a dry work chamber, with a conduit section of a predetermined size.

It is still another object of the invention to provide an improved method and apparatus for connecting a pipeline to an underwater installation.

A preferred form of the invention intended to accomplish at least some of the foregoing objects involves the use of an underwater work chamber to isolate the termini of a submerged pipeline and a riser from the water. The pipeline terminus is provided with an end cap which may be generally spherical or flat.

A draw line threaded through the submerged installation conduit is used to pull the buoyantly supported pipeline into snubbed engagement within an alignment or receiving funnel thereon. Within the work chamber, the receiving funnel and the end cap are removed and replaced by a welded conduit section to secure the pipeline and riser in fluid communication.

Since the pipeline is telescoped and snubbed into the alignment funnel, the pipeline and the installation conduit may be premarked for cutting, thereby enabling the use of a replacement conduit section of predetermined size.

THE DRAWINGS

Other objects and advantages will become apparent from the following detailed description of the invention with reference to the accompanying drawings in which:

FIG. 3 is a schematic illustration of an underwater welding habitat being lowered over the riser and pipeline termini;

FIG. 4 is a schematic illustration of the preparation of the riser and pipeline for connection;

FIG. 5 is a schematic illustration of the welded connection between the pipeline and riser.

DETAILED DESCRIPTION

General Environment

Figure 1:
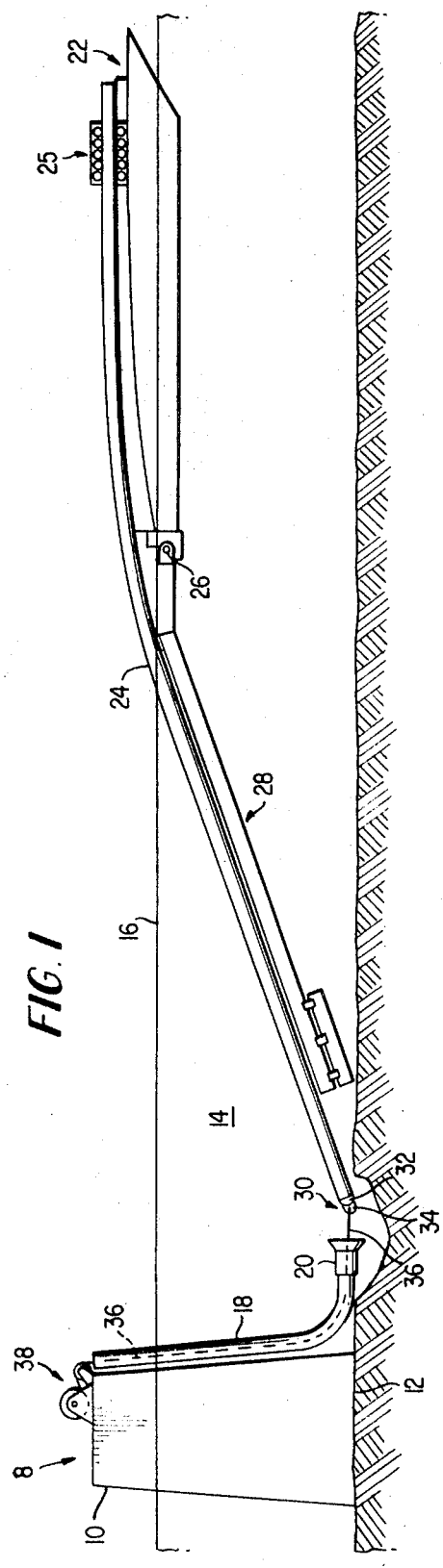
FIG. 1 is a schematic illustration of a buoyantly supported pipeline being pulled into an alignment funnel on a riser.

Referring now to FIG. 1, an underwater installation 8, including an offshore platform 10 located on a surface 12 submerged below a water body 14, is there shown.

Secured to the platform 10 in any suitable manner, and projecting above the water surface 16, is a generally J-shaped conduit or "riser" 18. This riser is provided on its submerged end with an alignment or receiving funnel 20 attached in any suitable manner. The funnel 20 is of outwardly diverging, generally frustoconical configuration.

A lay barge 22 is shown as floating on the water body 14. This barge supports an elongate flexible pipeline 24 which is about to be laid away from the platform 10.

Pivotally connected to the barge 22, as indicated at 26, is a pipelaying pontoon 28 for slidably and buoyantly supporting the pipeline 24 as it is being laid. For a more detailed description of the structure and mode of operation of a preferred form of the pontoon, reference may be had to U.S. Pat. Nos. 3,280,571 and 3,390,532, assigned to the assignee of the present invention. The disclosures of these patents are hereby incorporated by reference.

For simplicity, the invention will be described in connection with a "laying-away" operation, i.e., where the pipeline-laying operation is initiated adjacent an installation and is continued while moving away from its point of inception. However, it will be appreciated that the invention may also be employed in a "laying-toward" operation, i.e. where the pipeline-laying operation is nearing completion and requires the terminus of the pipeline to be connected to an installation.

Moreover, coupling of the pipeline 24 to an underwater installation in the form of an underwater wellhead rather than a riser is contemplated.

Detailed Structure and Operation

Referring now to FIG. 1, it will be seen that the pipeline terminus 30 is provided with a plug means 32. This plug means may be in the form of a generally spherical end cap, often termed a bull plug, and may be welded, or otherwise secured to the pipeline terminus. It will be apparent that a flat end cap may also be employed.

Projecting outwardly from the bull plug 32 and fixed thereto is a clevis 34.

Upon positioning of the lay barge 22 adjacent the platform 10, the pipeline 24 may be force fed, by means of a wheeled tension unit, schematically shown at 35, onto the pontoon 28. Reference may be had to the previously incorporated disclosure of U.S. Pat. No. 3,390,532 for a more detailed description of the structure and operation of the tension unit 25.

The pontoon 28 may be designed so as to float adjacent the surface of the water body 14 when the pipeline 24 has been fed outwardly of the lay barge 22 and to the end of the pontoon, i.e. without any substantial projection of the pipeline beyond the generally horizontally floating pontoon.

A draw line 36 threaded through the riser is attached to the clevis 34. The riser 18 may be installed with the draw line 36 in place and a diver may be employed to attach the draw line to a suitable line (not shown) extending from the lay barge 22 or extending from a service boat (not shown), for facilitating pulling of the draw line 36 to the surface where it is attached to the clevis 32.

It will be apparent that the other acceptable methods of attaching the draw line 36 to the clevis 32 will occur to those skilled in the art, and that the draw line 36 may alternatively be directly connected to a suitable draw line anchor means, other than an end cap, on the pipeline.

Figure 2:
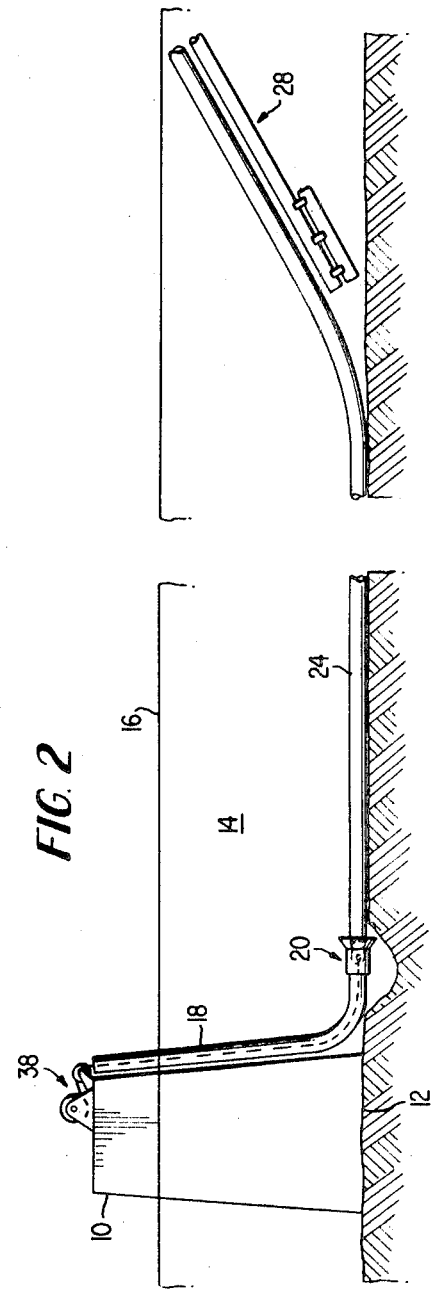
FIG. 2 is a schematic illustration of the pipeline telescoped and snubbed into the funnel.

Tension applied to the draw line 36 by a deck engine 38 on the platform 10, or by suitable pulling apparatus (not shown) on the lay barge moves the buoyantly supported pipeline 24 axially along and beyond the pontoon 28 until the pipeline terminus is telescopingly received in the funnel 20, as illustrated in FIG. 2. In the event the pulling apparatus is located on the lay barge, the use of a suitable platform-mounted sheave (not shown) may be required.

Movement of the pipeline beyond the pontoon 28 or controlled flooding of the pontoon, or both, causes the pontoon to assume a submerged position. If desired, the pontoon 28 may be of the articulated type or of the type which may be curved downwardly, such as that described in U.S. Rochelle et al. application Ser. No. 696,005 (filed Jan. 5, 1968) assigned to the assignee of the present invention.

Figure 2A:
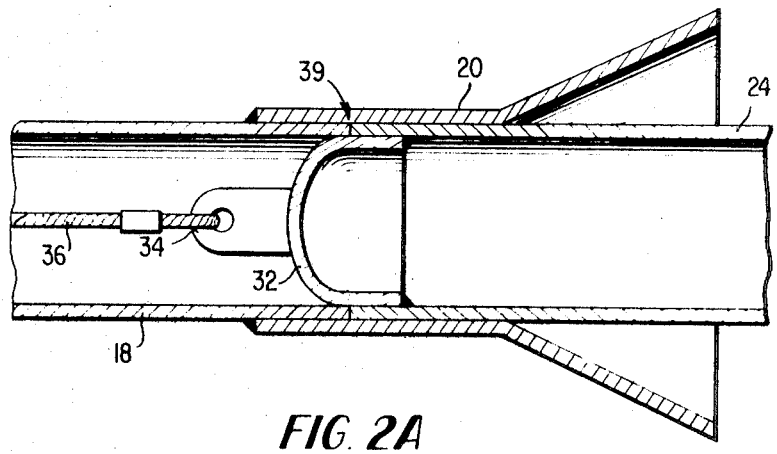
FIG. 2A is a cross-sectional elevational view of the telescoped and snubbed engagement between the pipeline and funnel.

The outwardly diverging, generally frustoconical configuration of the receiving funnel 20 causes the pipeline terminus to become generally axially aligned with the bottom portion of the riser when the internal diameter of the portion of the funnel adjacent the riser is substantially the same as, but slightly greater than the external diameter of the pipeline terminus as shown in FIG. 2A. Although the pipeline as shown has substantially the same diameter as the riser, it is feasible to have a pipeline terminus with an external diameter which is smaller than that of the riser, in which case, an internal annular projection (not shown) in the funnel may be provided to prevent movement of the pipeline terminus into the riser. In such a case, the axes of the pipeline and of the bottom riser portion may be coaxial or offset, but generally parallel.

For a purpose hereinafter described, the pipeline terminus may be moved into abutting relationship with the bottom portion of the riser inside the funnel, as indicated generally at 39 in FIG. 2A. In the case of a smaller diameter pipeline, an abutment may be mounted within the receiving funnel, between the riser terminus and the funnel mouth to abuttingly engage the received end of the pipeline.

During the pulling operation with the draw line 36, the pipeline-tensioning apparatus 25 may be employed to balance the pull of the draw line so as to control pipeline stress and to avoid uncontrolled pipeline motion.

Thus, during tensioning of the draw line, the pipeline 24 is slidably moved with respect to the lay barge 22 and pontoon 28, toward the platform 10 and the bending stress concentration on the portion of the pipeline being moved from the pontoon toward the riser is minimized.

When the lay barge has travelled a sufficient distance from the platform in order to lay the pipeline on the submerged surface 12, a work barge 42 is next located above the terminal portion of the pipeline 24 (FIG. 3). A suitable deck-located derrick means 43 may be used to lower a welding habitat 44 from the work barge 42 to a submerged position over the terminal portions of the pipeline and the riser, including the funnel 20 and the snubbed bull plug 32.

Figure 4A:
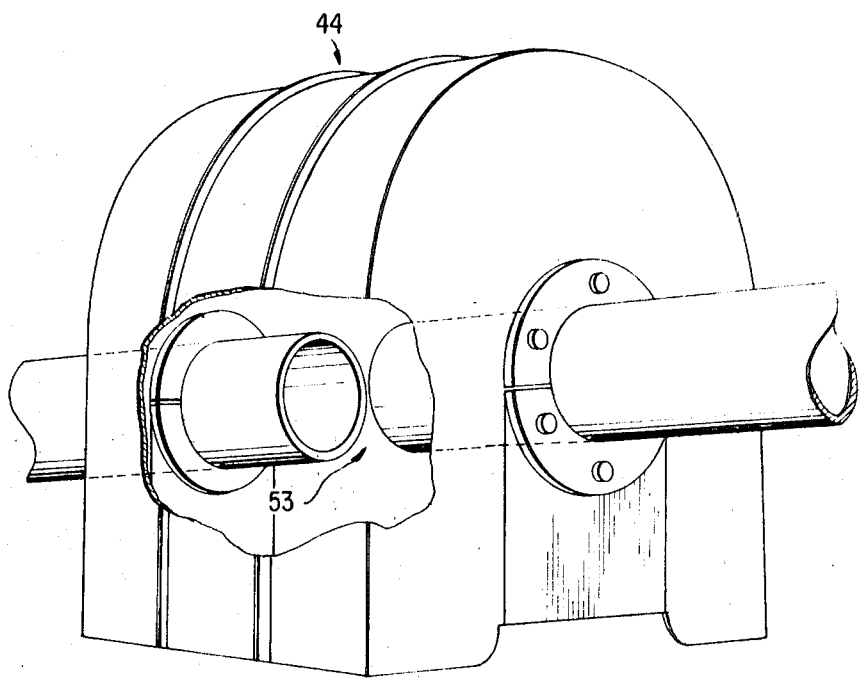
FIG. 4A is a schematic, cutaway perspective view of the habitat clamped about the aligned portions of the pipeline and rise.

As illustrated in FIG. 4, a life support and power umbilical means 46 is secured between the work barge 42 and the lowered habitat 44.

As previously provided excavation 48 in the submerged surface 12, located beneath the abutment of the pipeline and riser, permits the habitat 44 to completely envelop the pipeline and riser termini.

The habitat 44 is provided with an open bottom 45, and the end walls 47 and 49 are provided with aligned slots (see FIG. 4A), adjacent the bottom. These slots and the open bottom receive the portions of the pipeline and riser adjacent the termini, after which the end wall slots are sealed to prepare the habitat for pressurizing to an amount sufficient to keep water out of the habitat. For a more detailed description of a suitable habitat and the method of its use, reference may be had to U.S. Pat. No. 2,667,751, the disclosure of which is incorporated by reference.

Subsequently, the habitat is pressurized with a heavily nitrogenous atmosphere for welding control purposes, using the umbilical means 46, to thereby isolate the terminal portions of the riser and pipeline from the water. The average pressure within the dry chamber is thus equal to that of the water therebeneath, in the excavation 48. It will be appreciated that air or other economical gas may be used instead of nitrogen prior to and subsequent to the need for welding control.

Divers next descend to enter the habitat. If desired, they may be lowered in a suitable diver chamber 50. These divers may enter the habitat from beneath, through the open bottom via the excavation 48, or through any other suitable access opening to the habitat.

Removal of the riser terminus and pipeline terminus, including the funnel 20 and the plug means, indicated in phantom at 52 (FIG. 4), may be accomplished in the dry work chamber by mechanical or torch cutting. It will be appreciated that since the habitat 44 is clamped about the riser and the pipeline as indicated at 53 (FIG. 4A), the pipeline and the riser remain aligned throughout and subsequent to the cutting operation.

Thereafter, as illustrated in FIG. 5, the removed sections are replaced by a conduit section 54, welded at 56 and 58 to the spaced ends of the riser 18 and the flow line 24 to secure the two in fluid communication.

In instances where the telescoped pipeline has been snubbed into engagement with the riser (FIG. 2A), the riser and pipeline may be premarked for cutting. Thus, the replacement section 54 may be of a predetermined size and may be accurately positioned without the pipeline or riser having to be manipulated and without necessitating the use of templates or the like for determining the correct size of the needed replacement conduit. The habitat 44 is then removed, and the draw line is retrieved through the riser.

Of course, if a smaller diameter pipeline is employed, and the axes of the lower riser portion and the pipeline are offset, the replacement conduit section should be suitably shaped for accommodating this offset.

Since the cutting operation is performed within the pressurized habitat 44, a yieldable plug 60 (FIG. 4) is provided within the pipeline, remote from the terminus, to prevent escape of the nitrogenous atmosphere therethrough. This plug may be frictionally engaged with the pipeline to entirely block the flow passage at pressures on the order of those anticipated within the habitat. However, the plug is yieldable and may be forced through the pipeline by higher pressure fluid to open the flow passage.

In order that the plug 60 may pass the bend in the riser 18 when the flow passage is to be opened, it is preferably generally spherical in shape.

To further prevent escape of the nitrogenous atmosphere through the riser 18, a wire line stuffing box (not shown) is provided at the upper end of the riser. A passage in the box allows for threading of the draw line 36 through the riser, but the box is provided with means for sealing the riser to prevent outflow of the nitrogenous atmosphere within the habitat. Of course, the box and draw line may be removed subsequent to the installation of the replacement conduit 54.

Further details of a suitable stuffing box may be found on page 3799 of the 1968-69 Catalog of Otis Engineering Company, Dallas, Tex., (the disclosure of which is hereby incorporated by reference).

It will be appreciated that other suitable means for preventing escape of the habitat atmosphere may be provided in either the pipeline 24 or the riser 18, or both.

Moreover, it will be apparent that the plug 60 may be installed in the pipeline on the lay barge or from within the habitat immediately after the cutting operation.

SUMMARY OF ADVANTAGES AND SCOPE OF THE INVENTION

Thus, it may be seen that the present invention provides a method and apparatus for connecting a pipeline to an underwater installation conduit, in a manner which obviates the use of seals in the completed connection, as well as the necessity of precision lowering of the completed connection.

Particularly significant is the aspect of the invention relating to the telescoping of the pipeline terminus into snubbed engagement with the installation conduit. This feature permits the completion of the welded connection without pipeline manipulation, and without the need for a template to determine the size of the substitute conduit section to be welded to the spaced ends.

Also of importance is the balancing of the draw line tension with a tensioning apparatus and the buoyant support of the pipeline while the draw line tension is applied so as to minimize stress on the pipeline.

As will be apparent to those skilled in the art, methods of lowering the pipeline and subsequently positioning the pipeline, other than those described in connection with FIGS. 1, 2 and 2A may be practiced without departing from the spirit and scope of the invention. Also, the invention encompasses pipelaying operations wherein the pipeline has a larger, smaller, or different cross-sectional configuration from that of the riser, as well as operations remote from underwater installations.

Although the invention has been described with reference to one preferred form, other additions, not specifically described, will occur to those skilled in the art as well as modifications, substitutions, and deletions, which fall within isolating the terminal portion of the fixed underwater installation conduit portion and the adjacent terminal portion of the underwater pipeline extending from the floating vessel means from the body of water in which they are submerged by providing a dry workspace within the work chamber and then securing, by welding within the work chamber, the terminal portion of the underwater pipeline extending from the floating vessel means and the terminal conduit portion of the fixed underwater installation in fluidtight communication with one another.

2. The method according to claim 1 wherein:

the securing step is performed by welding a substitute conduit section between the spaced ends of the underwater installation conduit and the pipeline, after cutting away the termini thereof.

3. The method according to claim 1 including the steps of:

providing the underwater installation conduit with an alignment funnel, aligning the pipeline and the underwater installation conduit by telescoping the pipeline terminus into the alignment funnel, and clamping the work chamber about the underwater installation conduit and the pipeline prior to the securing step to maintain the two in alignment during the securing step.

4. A method of connecting an elongate flexible underwater pipeline to a conduit portion of an underwater installation, the method comprising:

providing the underwater installation conduit with an alignment funnel, aligning the pipeline and the underwater installation conduit by telescoping the pipeline terminus into the alignment funnel, the alignment step comprising moving the pipeline into snubbed engagement within the funnel, isolating the terminal portion of the underwater installation conduit portion and the adjacent terminal portion of the underwater pipeline from the body of water in which they are submerged by placing a submerged work chamber thereabout, and then securing by welding within the work chamber, the terminal pipeline portion and the terminal underwater installation conduit portion in fluidtight communication with one another, the securing step being performed subsequent to removing the alignment funnel and the telescoped portion of the pipeline, by welding a conduit section into aligned position between the spaced ends of the pipeline and the conduit portion of the underwater installation, and after clamping the work chamber about the underwater installation conduit and the pipeline to maintain the two in alignment during the securing step.

5. The method according to claim 4, wherein:

removing, within the work chamber, the pipeline terminus from the isolated portion of the pipeline and the receiving funnel from the isolated portion of the underwater installation, and welding a connecting conduit section to the remaining isolated pipeline portion and underwater installation portion to place them in fluid communication with one another.

8. The method according to claim 7 wherein the conduit portion of the underwater installation comprises a riser, and including the steps of:

threading a flexible draw line through the riser, connecting the draw line to the pipeline terminus, and tensioning the draw line to perform the telescoping step, while buoyantly supporting the pipeline and slidably moving the buoyant support with respect to the pipeline.

9. The method according to claim 8 including the step of:

snubbing the pipeline terminus within the receiving funnel upon telescoping the pipeline terminus into the receiving funnel.

10. A method of connecting an elongate flexible underwater pipeline to a conduit portion of an underwater installation, the method comprising:

telescoping the pipeline terminus into the terminus of the conduit of the underwater installation, providing a dry workspace surrounding the telescoped termini of the pipeline and the installation conduit, removing, within the dry workspace, the end portions of the underwater installation conduit and the pipeline, including at least the telescoped termini thereof, and securing within the dry workspace, the underwater installation conduit and the pipeline in fluid communication by installing a connecting conduit section between the spaced ends thereof.

11. The method according to claim 10 wherein:

the securing step is performed by welding the connecting conduit section to the spaced ends of the pipeline and underwater installation conduit, and the telescoping step is performed by threading a draw line through the installation conduit, connecting the draw line to the pipeline terminus, and tensioning the draw line while buoyantly supporting the pipeline.

12. Apparatus for connecting a pipeline to a conduit of an underwater installation, the apparatus comprising:

funnel means on the terminus of the conduit portion of the installation for telescopingly receiving the pipeline terminus, means on the pipeline terminus for snubbing the pipeline terminus within said funnel means, and habitat means for isolating the snubbed termini of the underwater installation and the pipeline from the water.

13. A method of connecting underwater conduits, the method comprising:

telescoping, underwater, a first conduit means into a second conduit means, providing a gaseous working atmosphere about the telescoped conduit means portions, removing the telescoped portions, within the gaseous atmosphere while maintaining the first and second conduit means clamped, and connecting the clamped conduit means in fluid communicating relation.